US006901386B1

(12) United States Patent
Dedrick et al.

(10) Patent No.: US 6,901,386 B1
(45) Date of Patent: May 31, 2005

(54) ELECTRONIC ASSET LENDING LIBRARY METHOD AND APPARATUS

(75) Inventors: Rick Dedrick, Hillsboro, OR (US); Laura I. Shine, Hillsboro, OR (US); Jeanne M. Koski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,443

(22) Filed: Mar. 31, 2000

(51) Int. Cl.$^7$ ............................................. G06F 17/60
(52) U.S. Cl. .................. 705/59; 380/201; 380/202; 717/163; 713/176; 713/156; 713/200; 713/193; 719/331
(58) Field of Search .................. 705/59, 1; 380/201, 380/202; 713/156, 176; 717/163, 331

(56) References Cited

U.S. PATENT DOCUMENTS

| | | | | |
|---|---|---|---|---|
| 4,791,565 A | * | 12/1988 | Dunham et al. ............ | 713/200 |
| 4,937,863 A | * | 6/1990 | Robert et al. .................. | 705/59 |
| 5,673,315 A | * | 9/1997 | Wolf ............................. | 705/59 |
| 5,745,879 A | * | 4/1998 | Wyman ......................... | 705/1 |
| 5,892,900 A | * | 4/1999 | Ginter et al. ................. | 713/200 |
| 5,911,045 A | * | 6/1999 | Leyba et al. ................. | 709/204 |
| 5,940,504 A | * | 8/1999 | Griswold ...................... | 705/59 |
| 6,023,766 A | * | 2/2000 | Yamamura .................... | 705/59 |
| 6,049,789 A | * | 4/2000 | Frison et al. ................. | 705/30 |
| 6,188,995 B1 | * | 2/2001 | Garst et al. ................... | 705/59 |
| 6,301,660 B1 | * | 10/2001 | Benson ........................ | 713/165 |

FOREIGN PATENT DOCUMENTS

| | | | | |
|---|---|---|---|---|
| EP | 570123 A1 | * | 11/1993 | ........... G06F/12/14 |
| EP | 667572 A1 | * | 8/1995 | ........... G06F/9/445 |
| EP | 735488 A1 | * | 10/1996 | ........... G06F/12/14 |

OTHER PUBLICATIONS

Yamada; Ken; Clamping down on Pirates; Computer Reseller News n690 pp. 3; Jul. 1, 1996.*
U.S. Appl. No. 09/541,391, Dedrick et al., filed Mar. 31, 2000.

* cited by examiner

*Primary Examiner*—James P. Trammell
*Assistant Examiner*—Daniel L. Greene
(74) *Attorney, Agent, or Firm*—Blakely, Sokoloff, Taylor & Zafman LLP (57) ABSTRACT

A electronic asset lending library method and apparatus enables the electronic management and reassignment of licenses for unused electronic assets installed on computers connected through a communications network. Licensing data for the unused electronic assets is released by the currently assigned owner and made available to one or more communities of users for display by product category, name, or keyword search. Once released, the lending library notifies the currently assigned owner to remove the unused electronic asset from their computer and transfers the licensing data to a library account. Eligible borrowers are permitted to request a re-assignment of an available released license for an unused electronic asset from a lending library account to their own account. Upon re-assignment the electronic asset lending library automatically notifies the borrower with instructions for the download and installation of the unused electronic asset to their computer. A borrower is determined to be eligible if she belongs to the same community as the currently assigned owner of the unused electronic asset and if she is on an access control list previously created for the unused electronic asset. Ineligible borrowers can request exception overrides to enable them to borrow a selected electronic asset. Licenses can be re-assigned at no cost or for a fee negotiated by the currently assigned owner.

27 Claims, 7 Drawing Sheets

ELECTRONIC ASSET LENDING LIBRARY METHOD AND APPARATUS

BACKGROUND OF THE INVENTION

1. Field of the Invention

The present invention relates generally to electronic commerce for electronic products. In particular, the present invention relates to technology that enables the electronic management and reassignment of licenses for electronic products installed on computers connected through a communications network.

2. Background Information

The growth in sales of packaged software has increased tremendously over the last few years. An industry trade group reports that the worldwide market for packaged software products for all platforms topped $154 billion dollars in 1999 alone, a 14.5% increase from the market in 1998. (*IDC Puts the Worldwide Packaged Software Market at $154 Billion in 1999*, International Data Corporation, Jan. 25, 2000, Press Release). The United States accounts for approximately 70% of this worldwide market, of which $24 billion dollars represents business software installed on personal computer platforms.

Business corporations and other enterprises are one of the largest consumers of packaged software as well as numerous other types of electronic products, including electronic databases, books, digital video, electronic works of art, electronic graphics, electronic magazines and brochures, and digital audio creations and recordings. As a result of their tremendous investment in packaged software and other types of electronic products, businesses view them as valuable electronic assets rather than consumable office products. In an effort to get the most value from their initial investment in electronic assets, corporate managers are placing more emphasis on the need to control electronic assets in much the same way as they control other corporate assets, through reuse and redeployment within the corporation whenever and wherever possible.

The notion of promoting sharing and reuse of software and other electronic products is known in the art. There are a number of widely available shareware libraries that make software and other electronic products freely available over the Internet for downloads and use. For example, the United States Small Business Administration hosts a shareware website that acts as a clearinghouse of freely available software to small business entrepreneurs. In 1995, the Software Engineering Institute of Electrical Engineers developed a standard for interoperating reuse libraries to help the engineering community share reusable software (IEEE Std 151420.1-1995, IEEE Standard for Information Technology-Software Reuse-Data Model for Reuse Library Interoperability: Basic Interoperability Data Model (BIDM), Approved, Dec. 12, 1995). An example of such a software reuse library is Netlib. The Netlib repository contains freely available software, as well as other electronic documents and databases of interest to the numerical, scientific computing, and other communities.

One of the many limitations of the prior art shareware and software reuse libraries, however, is the lack of controlled sharing and reuse of electronic assets, so as to insure compliance with the electronic product's licensing restrictions, if any. As a result, users of prior art shareware and reuse libraries can potentially create an unlimited number of unauthorized copies of the software or other electronic product. A related limitation is the lack of monitoring capability so as to identify and track the use of the electronic product from one user to the next. Moreover, shareware and reuse libraries are by their nature open to all users, and therefore lack the ability to restrict or partially restrict access to certain electronic assets based on the user's association with a particular class or group of users.

Since prior art shareware and electronic product reuse libraries do not insure license compliance, they also do not take advantage of recent advances in the technology for licensing software and other electronic products, including the use of electronic licensing schemes that electronically manage and distribute licenses for software and other electronic products installed on remote computers. Moreover, prior art shareware and reuse libraries do not even contain licensing data, but rather are content libraries that contain the actual software or other electronic content for purposes of electronic distribution over the Internet or other network. However, it is the licensing data that is necessary for businesses to monitor and control the authorized redeployment of electronic assets on remote computers; the content distribution and installation can be handled by existing distribution mechanisms. By not tracking the active users of a particular electronic asset, business administrators lose valuable opportunities for controlling the cost of electronic assets by recapturing unused assets for redeployment to other departments or users in the corporate computer enterprise that need the same product. Accordingly, a new approach for providing a reusable electronic asset library that facilitates the electronic management and reassignment of licenses is desirable, not only to to enable business administrators to control costs and get the most out of their electronic assets, but to do so in a way that insures license compliance. The integration of reuse libraries with electronic licensing technology in a user-friendly way presents a unique set of challenges, requiring a new and novel solution.

SUMMARY

According to one aspect of the invention, a method is provided in which a license is created for an unused electronic asset. The license is assigned to a first account belonging to a community, and reassigned to a second account that is eligible to use the license and which belongs to the same community as the first account.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, an electronic asset lending library (hereinafter "EALL") method and apparatus, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known features may be omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
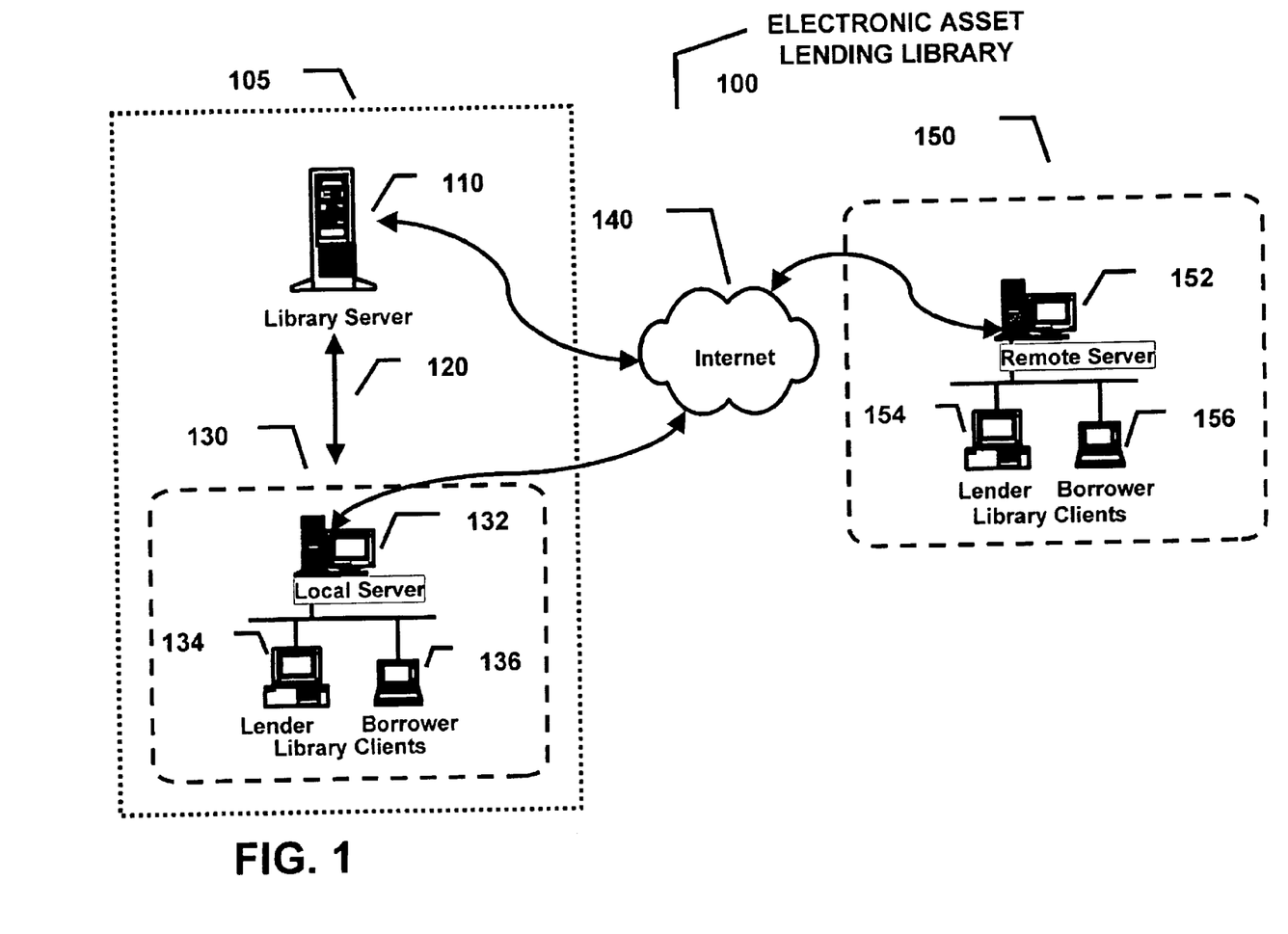
FIG. 1 illustrates an overview of the present invention and operating environment configured in accordance with one embodiment.

Referring now to FIG. 1, wherein an overview of the EALL method and apparatus in an operating environment configured in accordance with one embodiment is shown. As illustrated, the EALL server 110 in communication with library clients 130 and/or 150, either via a secure network connection 120 or over the Internet 140, or a combination thereof, reassigns a license for a particular electronic asset from a lender EALL client 134 or 154, to a borrower EALL client 136 or 156. Depending on the location of the lender and borrower EALL clients, the reassignment of the license may occur between lender and borrower EALL clients residing within a local area network served by local server 132 (e.g. 134 and 136), or may occur between lender and borrower EALL clients residing within an external network served by a remote server 152 (e.g. 154 and 156), or some variation of the foregoing configuration.

Figure 2:
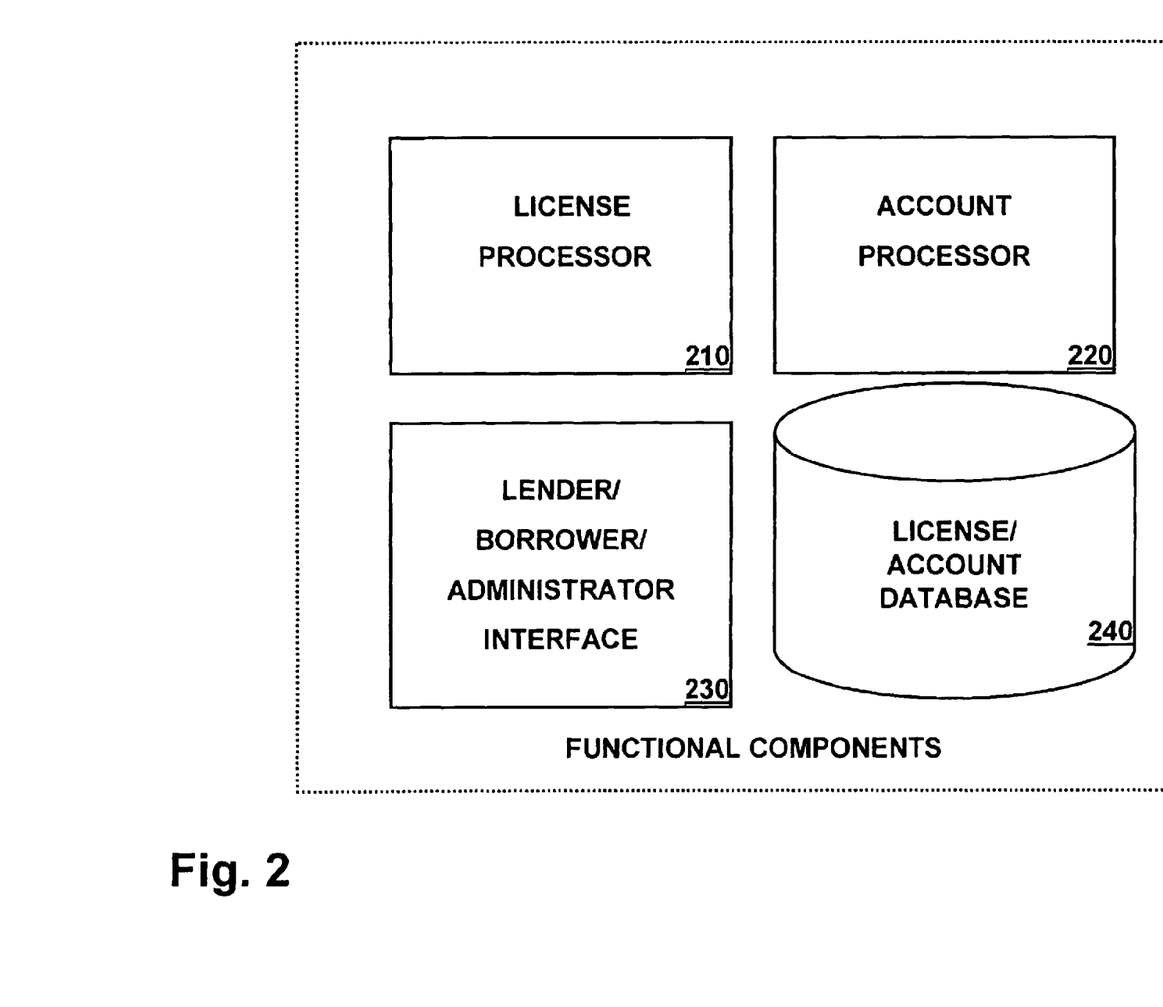
FIG. 2 illustrates a block diagram of the functional components of the present invention in accordance with one embodiment.

Referring now to FIG. 2, wherein a block diagram illustrating the functional components of the EALL method and apparatus are shown. The functional components include a license processor 210, an account processor 220, a lender/borrower interface 230, and a license/account database 240. Some of the functions performed by the license processor 210 include maintaining a catalog of available licenses for unused electronic assets, including license restrictions related to borrower eligibility, and applicable license fees, if any. The license processor 210 also performs functions for monitoring EALL clients, such as finding expired users of electronic assets for potential release of those assets into the EALL. Some of the functions performed by the account processor 220 include establishing, changing and deleting library accounts for EALL users, i.e. lenders, borrowers, and administrators, and maintaining their access control permissions. Accounts are grouped according to the community to which the user belongs. Access control permissions designate which EALL users in a particular community are eligible to borrow particular electronic assets, and are used in conjunction with the electronic asset restrictions to determine the conditions of use (e.g. applicable license fees, term of use, etc.). The access control permissions are set by certain administrative EALL users having access control authority within a community, such as department heads, product managers, team leaders and the like. The account processor 220 also performs functions for notifying EALL users about their accounts, such as reporting their usage of EALL electronic assets, or instructing EALL users to remove from their client computer installed EALL electronic assets whose licenses are being released back into the EALL. In one embodiment, the account processor 220 may perform functions for triggering a process on an EALL user's client computer to disable or remove the electronic product automatically.

The EALL license processor 210 and account processor 220 perform together to maintain in the license/account database 240 the relationship between the licenses for available electronic assets and the lender/borrower/administrator EALL user accounts with which they are associated. The lender/borrower interface 230 provides the EALL users with an entry point into the EALL through which the EALL users interact with the EALL license processor 210, account processor 220, and license/account database 240. In one embodiment, the lender/borrower interface 230 may use the browser facilities of the platform upon which the EALL is implemented. An alternative embodiment may be implemented as a separate application program that uses the graphical user interface facilities of the platform's operating system. The license/account database 240 is the repository for storing persistent data for the licenses and accounts processed by these other functional components. The license/account database 240 may be comprised of one physical database or a combination of different physical databases depending on the configuration of the various server and client computers on which the EALL method and apparatus is implemented.

Referring now to FIGS. 1 and 2 together, it should be understood that some or all of the above-described component functions 210, 220, 230, or 240 may be performed by one or more of the various EALL servers, 110, 132, and 152, and that some of the component functions may be performed by the EALL clients 130 and 150. Furthermore, the functional components may reside on the EALL clients 130, 150 and/or EALL servers 110, 132, and 152, which communicate over a local area network as shown, for example, in the configuration of library client 130, or over the Internet 140, or over a wide area network or combination of networks, or any other network configuration capable of connecting them. The physical database(s) comprising the license/account database component 240 may reside on one or more of the various EALL servers, 110, 132, and 152, and portions of the database(s) may be replicated on one or more of the various EALL clients 130 and 150 and periodically synchronized as needed with the data residing on the servers.

Figure 3:
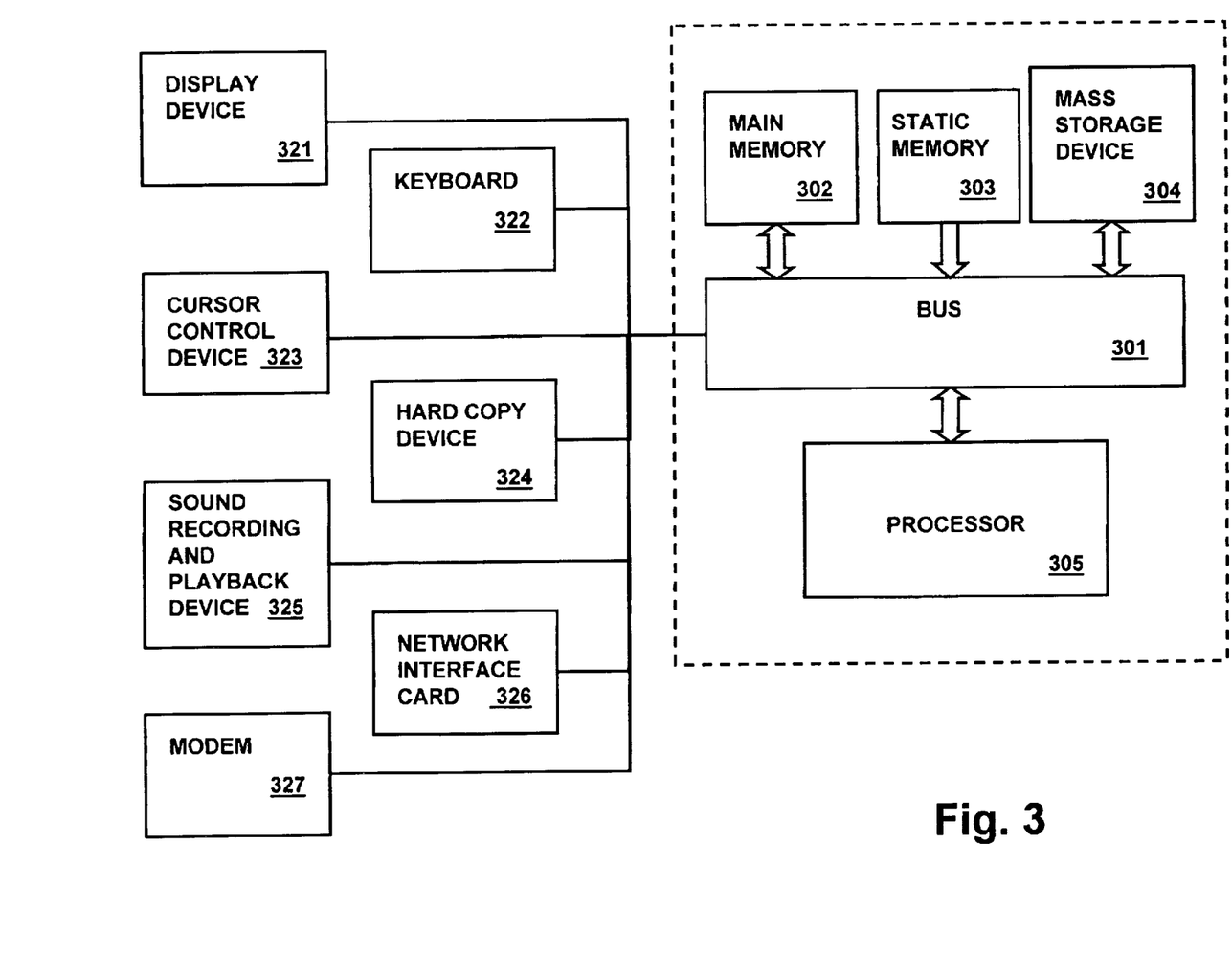
FIG. 3 illustrates a general-purpose computer system upon which an embodiment of the present invention may be implemented.

Referring now to FIG. 3, wherein a block diagram of a general-purpose computer system upon which an embodiment of the present invention may be implemented is shown. As illustrated, general-purpose computer system 300 comprises a bus 301, or other communications hardware and software, for communicating information, and a processor 305 coupled with bus 301 for processing information. Computer system 300 further comprises a random access memory (RAM) or other dynamic storage device 302 (referred to as main memory), coupled to bus 301 for storing information and instructions to be executed by processor 305. Computer system 300 also comprises a read only memory (ROM) 303, and/or other static storage device, coupled to bus 301 for storing static information and instructions for processor 305. Mass storage device 304 is coupled to bus 301 for storing information and instructions. In one embodiment, mass storage device 304 includes a library of licenses and client accounts used to manage the lending and borrowing of the available electronic assets by various electronic asset lending library clients.

Furthermore, mass storage device 304, such as a magnetic disk or optical disk, and its corresponding disk drive, can be coupled to computer system 300. Computer system 300 can also be coupled via bus 301 to a display device 321 for displaying information to a computer user such as a network manager. Display device 321 is used to display windows containing a graphical user interface to the available electronic assets managed by the electronic asset lending library. Display device 321 can include a frame buffer, specialized graphics rendering devices, a cathode ray tube (CRT), and/or flat pane display. An alphanumeric input device 322, including alphanumeric and other keys, is typically coupled to bus 301 for communicating information and command selections to processor 305. Another type of user input device is cursor control device 323, such as a mouse, a trackball, a pen, a touch screen, or cursor direction keys for communicating direction information and command selections to processor 305, and for controlling cursor movement on display device 321. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 301 is a hard copy device 324 which may be used for printing instructions, data, or other information on a medium such as paper, film, or similar types of media. Additionally, computer system 300 can be coupled to a device for sound recording, and/or playback 325, such as an audio digitizer coupled to a microphone for recording information. Further, the device may include a speaker that is coupled to a digital to analog (D/A) converter for playing back the digitized sounds.

Network interface card 326 is coupled to bus 301. Network interface card 326 is further coupled to an external computer network (not shown). Network interface card 326, in conjunction with appropriate data communications protocols (e.g., the TCP/IP suite of internetworking protocols), provide the means by which a electronic asset lending library operating on a general-purpose computer system 300 exchanges information with other devices coupled to the same computer network. Modem 327 is coupled to bus 301, and provides an alternate means of exchanging information with other devices for which a modem connection to an external computer network or device (not shown) can be established.

Computer system 300 and EALL application software stored and executed therein as part of the EALL method and apparatus operate in conjunction with an operating system with graphics capability, such as Microsoft's Windows operating system. Commercially available computer systems implementing the features of general-purpose computer system 300 include a broad range of operating system-based computers, including server computers, desktop computers, workstations, devices, or appliances. Furthermore, the present invention may be used in conjunction with various browser (e.g. Microsoft Internet Explorer or Netscape Navigator) and electronic mail applications (e.g. Microsoft Outlook, and Lotus Notes) or other messaging applications to yield an operational EALL platform upon which an embodiment of the present invention may be implemented.

Figure 4:
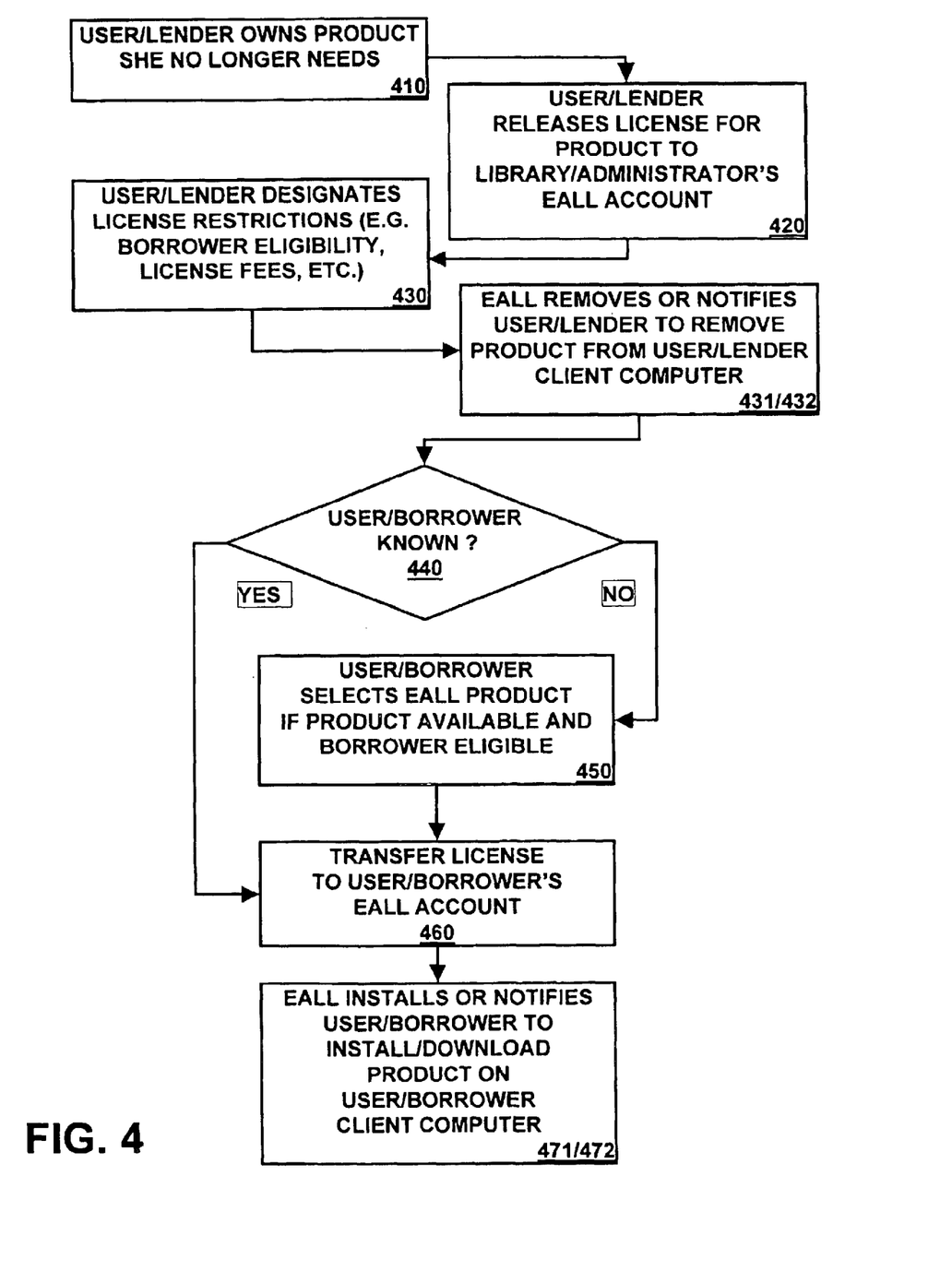
FIG. 4 illustrates a block diagram of a typical scenario in which the present invention may be used in accordance with one embodiment.

Referring now to FIG. 4, wherein a block diagram of a typical scenario in which the EALL method and apparatus may be used in accordance with one 1 embodiment, is shown. As illustrated, the process begins with an user/lender that owns a license for an electronic asset, such as a software application, electronic book, electronic work of art, electronic graphics item, electronic magazine or brochure, or digital video or audio creation or recording that he or she no longer needs 410. For example, employee A may have resigned or transferred to a different department, and a new employee B fills their position. Or perhaps a project has ended and the design application software purchased for use during the project is no longer needed by employees in department C, but may be needed by employees in department D where a new project requiring the same design software has begun. In each case, the user decides to release the licenses for the unused electronic asset to the corporate EALL using the facilities of the present invention.

Using their EALL account, the user/ender invokes the functions of the EALL license processor 210 to "loan" the license to the EALL, also described as "releasing" the license to the EALL library/administrator's account 420. The user/lender designates any license restrictions which the user/lender desires to impose on subsequent borrowers, including borrower eligibility and applicable license fees, it any, 430. For example, the user/lender may know the specific borrower to whom he or she wishes to use the license next, or may wish to restrict use of the license to borrowers in the same department without charging a fee, or else charge a license fee for borrowers outside the department. The latter arrangement allows the lending department, or other corporate entity that made the initial investment in the electronic product, to "recoup" that investment from other users within the corporation, while at the same time saving the new user/borrower the additional expenditure associated with purchasing a new license for the product. Once the license is released, the user/ender is notified that the software application must be removed from the user/lender's computer 431. Alternatively, the software application or other electronic product can be automatically removed or disabled 432 in response to commands generated by the EALL account processor 210 using available electronic license and electronic product distribution mechanisms.

If the new user/borrower is known 440, as is the case with employees A and B, the newly released license can be transferred directly into the new user/borrower's EALL account 460. In one embodiment, the new user/borrower is notified by email or other messaging service that the product can now be installed on the new user/borrower's computer 471. Alternatively, the product can be automatically installed 472 in response to commands generated by the EALL account processor 210 using available electronic license and electronic product distribution mechanisms.

If the new user/borrower is not known 440, as is the case with departments C and D, the newly released license remains in the EALL library/administrator's account, which allows the unused electronic asset to be made available to borrowers through the functions of the EALL user interface 230. Later, a prospective user/borrower selects the unused electronic asset to borrow, after determining that there are available released licenses that have no restrictions that prohibit his or her use in accordance with any account restrictions set by the EALL library/administrator, or license restrictions set by the EALL user/lender 450. The available released license can then be transferred directly into the new user/borrower's EALL account 460. In one embodiment, the new user/borrower is notified by email or other messaging service that the product can now be installed on the new user/borrower's computer 471. Alternatively, the product can be automatically installed 472 in response to commands generated by the EALL account processor 210 using available electronic license and electronic product distribution mechanisms.

Figure 5:
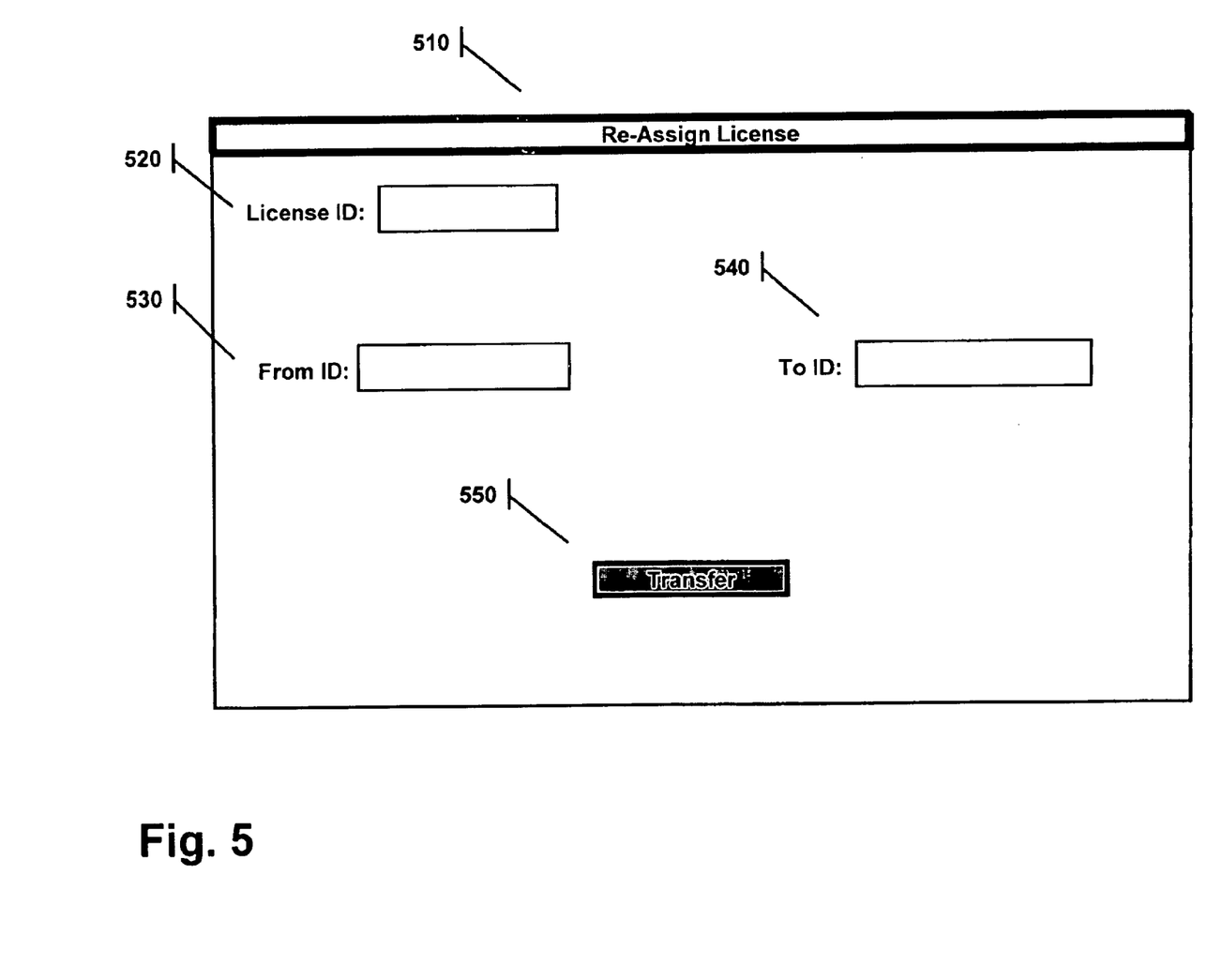
FIG. 5 illustrates an example of a display of a Re-Assign License page, in accordance with one embodiment.

Referring now to FIG. 5, wherein one embodiment of an EALL user interface 230 for transferring a license is shown. To transfer a license, the license can be released to the EALL library for subsequent re-assignment, or it may be re-assigned directly from one EALL user to the next. Using a menu-based or other navigational aid, the EALL user/lender/administrator desiring to transfer a license for an unused electronic asset using the EALL navigates the EALL user interface 230 to cause the display of a Re-Assign Licenses page 510, as illustrated in FIG. 5. The EALL user/administrator can be the lender herself, or a manager, team leader or other individual responsible for managing the electronic assets for the lender and, depending on their status, may navigate to the Re-Assign Licenses page using different routes.

The Re-Assign Licenses page 510 contains, among other items, at least three input areas: one for entering or selecting the license to be transferred 520, one for entering or selecting the EALL user to whom the license is currently assigned 530 ("From" box), and one for entering or selecting the EALL user to whom the license will be transferred 540 ("To" box). If the individual EALL user to whom the license will be transferred is unknown, i.e. the license is being released to the EALL library administrator for subsequent lending, then the EALL user/administrator simply selects the Library as the EALL user to whom the license will be transferred. When appropriate, all licenses currently assigned to a particular user may be transferred at once by entering or selecting multiple licenses in input area 520, or alternatively entering an identifier that represents all of the licenses, including leaving the selection blank. A command button or other graphical visual icon is provided for affirmatively entering a command to carry out the transfer 550 ("Transfer") based on the selections in input areas 520, 530, and 540. The sequence of EALL user interactions with the Re-Assign Licenses page 510 is summarized in Table 1. It should be understood that the Re-Assign Licenses page 510 as shown is for descriptive purposes only, and that other variations for accomplishing the described entry, selections or commands to the EALL user interface 230 may be employed without departing from the principles of or exceeding the scope of the present invention.

TABLE 1

Re-Assign License

1. Navigate to the Re-Assign Licenses page;
2. Select/enter the license(s) to be transferred;
3. In the Re-Assign License From box, select/enter the user from which the license is to be transferred;
4. In the Re-Assign License To box, select/enter the user (or library) to whom the license is to be transferred; and
5. Click the Transfer button to transfer the license(s).

Figure 6:
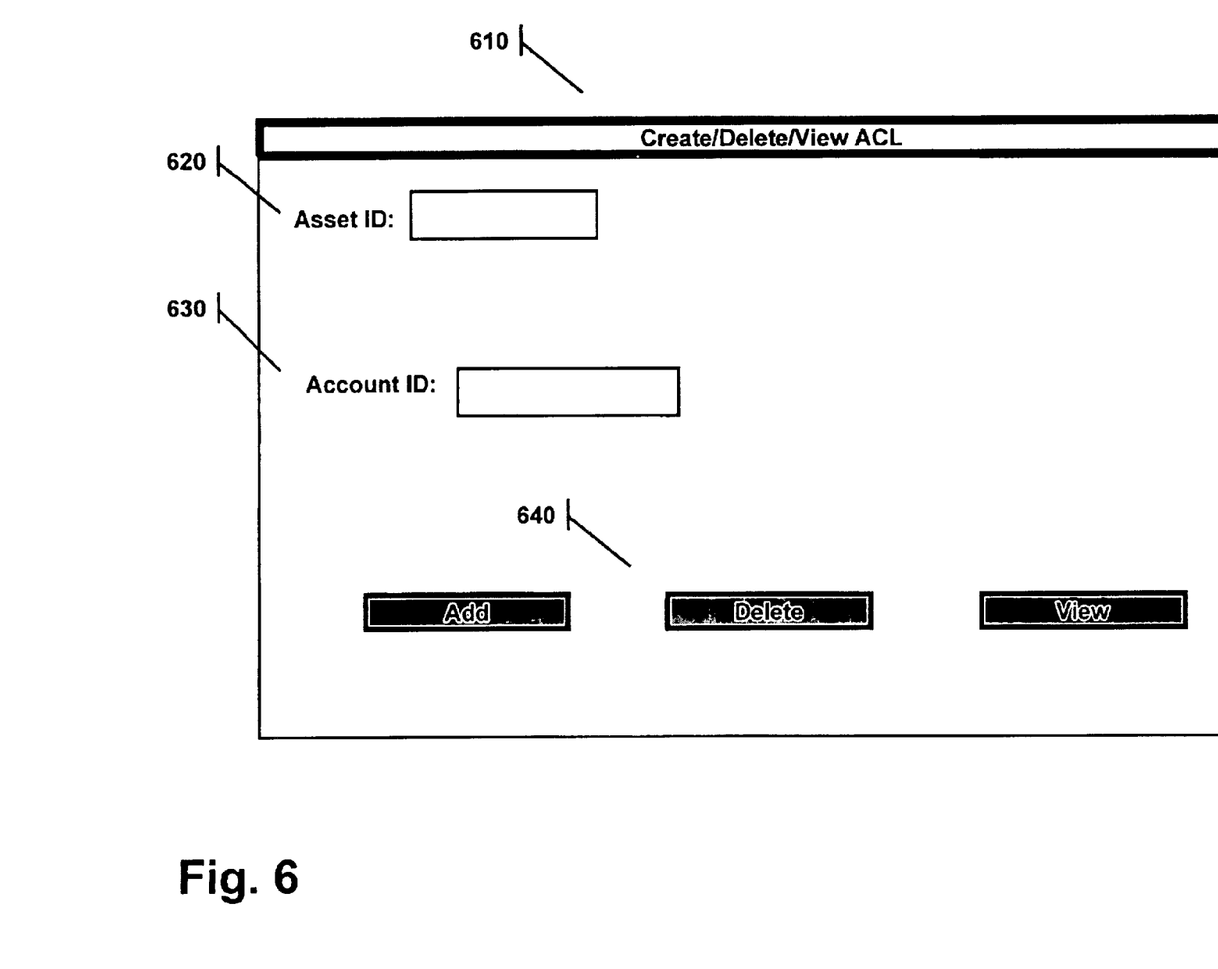
FIG. 6 illustrates an example of a display of a Create/Delete/View ACL page, in accordance with one embodiment.

Referring now to FIG. 6, wherein one embodiment of an EALL user interface 230 for maintaining access control permissions of prospective borrowers of a license for a particular unused electronic asset is shown. To control access to electronic assets released to the EALL, the EALL user/administrator can create an Access Control List (ACL) that designates which users are eligible to borrow which unused electronic assets. By default, all EALL users having EALL accounts within the same community (e.g. division, department, team, etc.) are eligible to view and borrow unused electronic assets currently assigned to that community. However, the creation of an ACL restricts eligibility to only those users present on the ACL. So, for example, if user A and B are in the same community, and user A releases software X with an ACL restriction and user B is not listed on the ACL, then user B can only view software X, but not borrow it. The effect of not being on an ACL can take the form of disabling those portions of the EALL user interface 230 that would allow the EALL user to transact a loan (e.g. the "Borrow/Purchase" buttons or restricted product titles might be displayed as crossed out or shadowed to visually indicate that those actions or unused electronic assets are unavailable to the EALL user/borrower without requesting access override permission through his or her manager, team leader, etc.). EALL user/borrowers outside the community can neither view nor borrow electronic assets without requesting access override permission. Access override permission may be granted by setting up a proxy account for the EALL user/borrower or altering the ACL.

Using a menu-based or other navigational aid, the EALL user/administrator desiring to create or modify an ACL for an unused electronic asset using the EALL navigates the EALL user interface 230 to cause the display of a Create/Delete/View ACL page 610, as illustrated in FIG. 6. The EALL user/administrator is typically a product manager, team leader or other individual responsible for managing the electronic assets for a particular community. Only those EALL user/administrators with authority to create ACLs will be permitted access to the Create/Delete/View ACL page 610 of the EALL user interface 230. The Create/Delete/View ACL page 610 contains, among other items, at least two input areas: one for entering or selecting the unused electronic asset for which available licenses are to be restricted 620 or for which the existing ACL is to be viewed, one for entering or selecting the name or account of the EALL user to be added, viewed, or deleted from the ACL for the designated electronic asset 630. A command button or other graphical visual icon is provided for affirmatively entering a command to carry out the add, delete, or view actions 640 based on the selections in input areas 620 and 630. The sequence of EALL user interactions with the Create/Delete/View ACL page 610 is summarized in Table 2. It should be understood that the Create/Delete/View ACL page 610 as shown is for descriptive purposes only, and that other variations for accomplishing the described entry, selections or commands to the EALL user interface 230 may be employed without departing from the principles of or exceeding the scope of the present invention.

TABLE 2

Create/Delete/View Access Control List (ACL)

1. Navigate to the Create/Delete/View ACL page;
2. Select/enter the name or identification of the electronic asset for which license(s) are or will be restricted;
3. Select/enter the name or identification of the EALL user you want to add/delete/view to or from the ACL for the designated electronic asset in item 2;
4. Click the Create/Delete/View button to carry out the desired action to create, delete, or view the restrictions for the designated electronic asset.

Figure 7:
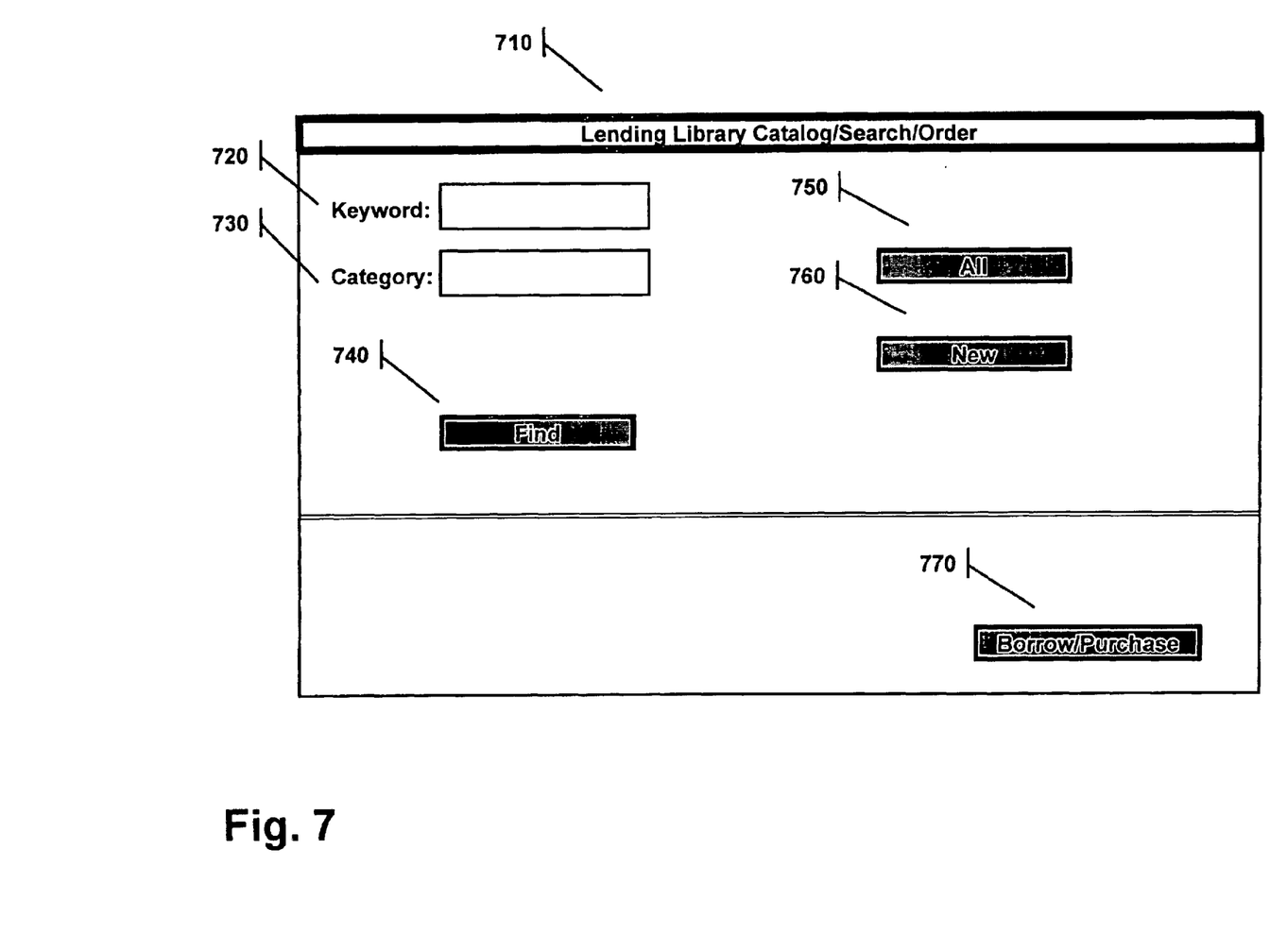
FIG. 7 illustrates an example of a display of a Lending Library Catalog/Search/Order page, in accordance with one embodiment.

Referring now to FIG. 7, wherein one embodiment of an EALL user interface 230 for borrowing a license is shown. To be eligible to borrow a license, the EALL user/borrower must belong to the same community as the EALL library/administrator (or lender) to whom the license is currently assigned. The EALL user/borrower must also be listed on the ACL, if any, for the unused electronic asset. If there is no ACL for the desired asset, then any EALL user/borrower within the same community is eligible to borrow an available license. If the EALL user/borrower is not on an ACL, then he or she must make a request to their manager, team leader, etc. to override the ACL so that they can borrow the license. Licenses for unused electronic assets that are loaned to an EALL user/borrower belonging to the same community are typically loaned without a fee. However, if the EALL user/borrower has been restricted from access (i.e. is not on the ACL) or does not belong to the same community, the EALL user/borrower must request an override, and may be required to negotiate a purchase fee from the EALL library/administrator to whom the license is currently assigned.

Using a menu-based or other navigational aid, the EALL user/borrower desiring to borrow a license to use an unused electronic asset using the EALL navigates the EALL user interface 230 to cause the display of a Lending Library Catalog/Search/Order page 710, as illustrated in FIG. 7. The Lending Library Catalog/Search/Order page 710 contains, among other items, at least two input areas: one for entering or selecting a category that most closely matches the type of product the borrower is looking for 720, and one for selecting or entering keyword information about the desired product the borrower is looking for 730. A command button 740 or other graphical visual icon is provided for affirmatively entering a command (e.g. "Find Product") to carry out the category or keyword search selections in input areas 720 and 730. Additional command buttons may be provided, including one to view all of the products available in the EALL user/borrower's community alphabetically 750 ("All Products"), or one to view all of the products that are newly available 760 ("New Products") since the EALL user/borrower's last visit to the Lending Library Catalog/Search/Order page 710. In addition, a command button is provided to transact a request to borrow or purchase a license for the product as appropriate 770 ("Borrow/Purchase"). The request to borrow or purchase a license for the product will cause the EALL to transfer an available license from the EALL library/administrator account to the EALL user/borrower's account, and subsequent notification of permission to install/download the product to the EALL user/borrower's client computer. In one embodiment, the EALL may also automatically trigger an install/download of the product to the EALL user/borrower's client computer using available electronic product distribution and licensing mechanisms in response to the EALL user/borrower's request to borrow/purchase the product using the Lending Library Catalog/Search/Order page 710. The sequence of EALL user interactions with the Lending Library Catalog/Search page 710 is summarized in Table 3. It should be understood that the Lending Library Catalog/Search page 710 as shown is for descriptive purposes only, and that other variations for accomplishing the described entry, selections or commands to the EALL user interface 230 may be employed without departing from the principles of or exceeding the scope of the present invention.

TABLE 3

Lending Library Catalog/Search/Order

1. Navigate to the Library Catalog/Search page;
2. Select/enter the keyword information or category, if known, of the product for which a license is desired; and
3. Click the Find Product/All Products/New Products command button as appropriate to view the designated product in item 2, or all of the software alphabetically, or just the new products added to the library since last visit.
4. Click the Borrow/Purchase command button as appropriate to request the transfer of a license for the product designated in items 2 and/or 3.

Accordingly, a novel method and apparatus is described for a electronic asset lending library method and apparatus, so as to enable the electronic management and redistribution of licenses for electronic assets installed on computers connected through a communications network.

Epilogue

From the foregoing description, those skilled in the art will recognize that many other variations of the present invention are possible. In particular, while the present invention has been described as being implemented in EALL servers 110, 132, and 152, and EALL clients 130 and 150, some of the logic described in functional components 210, 220, 230, and 240, may be distributed in other components of a general-purpose computer system 300. Thus, the present invention is not limited by the details described. Instead, the present invention can be practiced with modifications and alterations within the spirit and scope of the appended claims.

What is claimed is:

1. A lending library apparatus comprising:
    an electronic asset lending library database containing a plurality of user accounts and at least one license corresponding to an electronic asset provided to the database;
    an account manager to maintain the user accounts;
    an asset manager to maintain each license, wherein each license includes one or more license restrictions set by the user that assigned the electronic asset;
    a loan manager to control the assignment of each license to another user having another one of the plurality of user accounts according to the license restrictions set by the user that assigned the electronic asset; and
    processors to find user accounts having electronic assets with an expired license, to request a user having an expired license to return or remove any electronic assets corresponding to the expired license, and to maintain a catalog of unassigned licenses for electronic assets.

2. The apparatus of claim 1, further comprising a notification manager to notify an assignee of the license for the electronic asset when the loan manager approves an assignment to the assignee of the license for the electronic asset.

3. The apparatus of claim 1, wherein:
    the account manager further maintains a subset of the plurality of user accounts as members of a one of a plurality of communities;
    the asset manager further maintains ownership of the license by one of the communities; and
    the loan manager restricts the assignment of the license for the electronic asset to an assignee having a user account in the community having ownership of the license.

4. The apparatus of claim 1, wherein:
the account manager further maintains a subset of the plurality of user accounts as members of a one of a plurality of access control lists;
the asset manager further maintains an association between the access control list and the electronic asset; and
the loan manager restricts the assignment of the license for the electronic asset to an assignee having a user account in an access control list associated with the electronic asset.

5. The apparatus of claim 4, wherein the access control list restriction is overridden in response to a request by an assignee not having a user account in the access control list associated with the electronic asset.

6. The apparatus of claim 2, wherein the assignee notification is an electronic message addressed to the assignee containing written instructions for installing the electronic asset.

7. The apparatus of claim 2, wherein the notification is communicated over a communications network.

8. The apparatus of claim 7, wherein the communications network is the Internet.

9. The apparatus of claim 2, further comprising:
an electronic distribution mechanism to install the electronic asset on the assignee's computer in response to the approval of an assignment of a license corresponding to the electronic asset.

10. The apparatus of claim 3, wherein a community is one of a plurality of types of intra-organizational entities, including a project team, department, or division.

11. An article of manufacture comprising:
an electronically accessible medium providing instructions that, when executed by an apparatus, cause the apparatus to manage a plurality of user accounts;
manage at least one license corresponding to an electronic asset provided by a user having one of the plurality of user accounts, the license including one or more license restrictions set by the user;
control the assignment of the at least one license to another user having another one of the plurality of user accounts according to the license restrictions;
notify the assignee when an assignment to the assignee of the license for the electronic asset is approved;
find user accounts having electronic assets with an expired license;
request a user having an expired license to return or remove any electronic assets corresponding to the expired license; and
maintain a catalog of unassigned licenses for electronic assets.

12. The article of manufacture of claim 11, wherein the electronically accessible medium providing instructions that, when executed by the apparatus, cause the apparatus to manage the plurality of user accounts includes instructions to cause the apparatus to associate each user account with a one of a plurality of communities;
to manage the license includes instructions to cause the apparatus to associate the license with a one of the plurality of communities and assign the license to one of the plurality of user accounts; and
control the assignment of the at least one license further includes instructions to cause the apparatus to restrict the assignment of the license to eligible assignees, wherein an eligible assignee is associated with the same community as the license.

13. The article of manufacture of claim 12 wherein the electronically accessible medium providing instructions that, when executed by an apparatus, further cause the apparatus to display the electronic asset; and
reassign the license of the electronic asset to another one of the plurality of user accounts in response to a selection of the electronic asset from the display by an assignee using the another one of the plurality of user accounts.

14. The article of manufacture of claim 13 wherein the electronically accessible medium providing instructions that, when executed by the apparatus, cause the apparatus manage the plurality of user accounts includes instructions that cause the apparatus to add or delete each user account into at least one of a plurality of access control lists;
manage the license includes instructions that cause the apparatus to associate the electronic asset with a one of the plurality of access control lists; and
control the assignment of the at least one license further includes instructions that cause the apparatus to restrict the assignement of a license to an assignee listed on the access control list to which the electronic asset is assigned.

15. A method comprising:
managing a plurality of user accounts;
managing licenses for a plurality of electronic assets;
receiving a request from a user of one of the plurality of user accounts to assign an electronic asset to another user of another of the plurality of user accounts;
generating a license and associated license restrictions for the electronic asset according to the restrictions specified by the user requesting the assignment;
adding the license of the electronic asset to the plurality of licenses;
controlling the assignment of each license to an assignee having one of the plurality of user accounts according to the license restrictions specified by the user that assigned the electronic asset;
finding user accounts having electronic assets with an expired license; and
requesting a user having an expired license to return or remove any electronic assets corresponding to the expired license.

16. The method of claim 15, wherein:
managing the plurality of user accounts includes associating each user account with a one of a plurality of communities;
managing the licenses includes associating each license with one of the plurality of communities and assigning each license to one of the plurality of user accounts; and
controlling further includes restricting the asssignment of licenses to an assignee who is associated with the same community as the license.

17. The method of claim 16, wherein the one of a plurality of communities is an organizational entity, including a division, department or team.

18. The method of claim 15, further comprising displaying the plurality of electronic assets.

19. The method of claim 18, further comprising receiving a selection of one of the plurality of electronic assets from the display by an assignee using one of the plurality of user accounts, approving an assignment of the electronic asset to the assignee based on the license restrictions associated with the electronic asset, and reassigning the license for the electronic asset to the assignee's user account.

20. The method of claim 15, wherein:

managing the plurality of user accounts includes adding or deleting each user account into at least one of a plurality of access control lists;

managing the license includes associating the electronic asset with a one of the plurality of access control lists; and controlling further includes restricting the assignment of a license to an assignee listed on the access control list to which the electronic asset is assigned.

21. A computer implemented method comprising:

managing a plurality of user accounts;

generating a license and associated license restrictions for an electronic asset on a lending library server, wherein the electronic asset is provided by a user having one of the plurality of user accounts and the license restrictions are set by the user that provided the electronic asset;

displaying to an assignee having another one of the plurality of user accounts the license and associated license restrictions on a lending library client;

receiving an assignee's selection for the license and transferring the license to the assignee if eligible in accordance with the associated license restrictions;

transmitting to the assignee instructions for the installation of the electronic asset in compliance with the transferred license on the lending library client;

finding user accounts having electronic assets with an expired license; and requesting a user having an expired license to return or remove any electronic assets corresponding to the expired license.

22. The method of claim 21, wherein the lending library server and the lending library client are connected to a communications network.

23. The method of claim 21, wherein the associated license restrictions require the assignee to belong to a community, the community being the same community to which the electronic asset belongs.

24. The method of claim 23, wherein the associated license restrictions further require the assignee to be listed on an access control list associated with the electronic asset.

25. The method of claim 23, wherein the community is an organizational entity, including a division, department or team.

26. The apparatus of claim 1, wherein the electronic asset lending library database resides on a removable data storage device.

27. The apparatus of claim 26, wherein the data storage device is a CD-ROM or a DVD-ROM.

\* \* \* \* \*